United States Patent
Miyashita

(10) Patent No.: US 6,244,894 B1
(45) Date of Patent: Jun. 12, 2001

(54) CELLULAR PHONE BATTERY EQUIPPED WITH IC CARD

(75) Inventor: Toshikazu Miyashita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/518,057

(22) Filed: Mar. 2, 2000

(30) Foreign Application Priority Data

Mar. 2, 1999 (JP) .................................. 11-054683

(51) Int. Cl.$^7$ ............................................. H01R 3/00
(52) U.S. Cl. ................................. 439/500; 455/558
(58) Field of Search .................. 439/500; 235/441; 429/91, 99, 100; 455/558

(56) References Cited

U.S. PATENT DOCUMENTS

| | | | | |
|---|---|---|---|---|
| 5,534,366 | * | 7/1996 | Hwang et al. | 429/91 |
| 5,541,985 | * | 7/1996 | Ishii et al. | 379/111 |
| 5,669,069 | * | 9/1997 | Rautila | 455/558 |
| 5,786,106 | * | 7/1998 | Armani | 429/98 |
| 5,831,256 | * | 11/1998 | De Larminat et al. | 235/486 |
| 5,883,786 | * | 3/1999 | Nixon | 361/737 |
| 5,894,597 | * | 4/1999 | Schwartz et al. | 455/558 |
| 5,924,044 | * | 7/1999 | Vannatta et al. | 455/556 |
| 5,973,475 | * | 10/1999 | Combaluzier | 320/107 |
| 5,975,016 | * | 6/1999 | Savalle et al. | 379/433 |
| 6,009,315 | * | 12/1999 | De Larminat et al. | 455/90 |
| 6,068,186 | * | 5/2000 | Jubert | 235/441 |

FOREIGN PATENT DOCUMENTS

| | | |
|---|---|---|
| 5-9057 | 2/1993 | (JP) . |
| 7-4661 | 2/1995 | (JP) . |
| 2526500 | 6/1996 | (JP) . |
| 2569210 | 1/1998 | (JP) . |

* cited by examiner

Primary Examiner—Brian Sircus
Assistant Examiner—Hae Moon Hyeon
(74) Attorney, Agent, or Firm—Ostrolenk, Faber, Gerb & Soffen, LLP

(57) ABSTRACT

Disclosed is a power-source battery unit to be attached detachably to a cellular phone for radio transmission/reception. This battery unit has: a battery cover with which a battery cell is covered; a first card mounting part formed in the battery cover; and a plug-in size IC card attached detachably to the first card mounting part. When the battery unit is attached to the cellular phone, the terminal of the IC card attached to the first card mounting part is electrically connected to the cellular phone side.

19 Claims, 9 Drawing Sheets

FIG.3A PRIOR ART
FIG.3B PRIOR ART
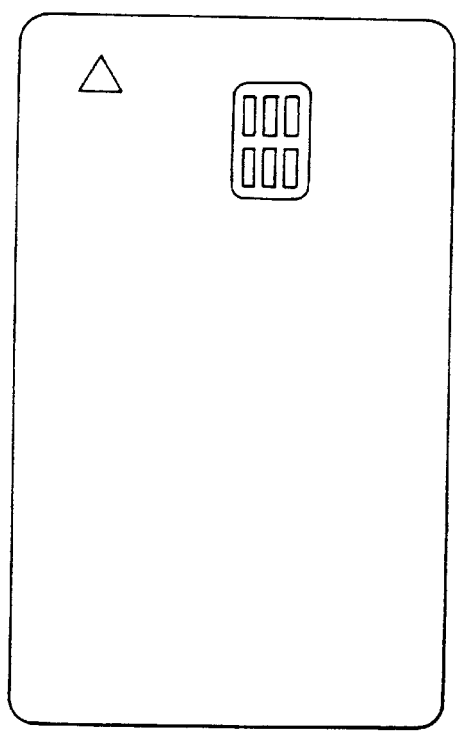
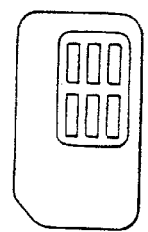

CELLULAR PHONE BATTERY EQUIPPED WITH IC CARD

FIELD OF THE INVENTION

This invention relates to a power-source battery unit to be attached detachably to a cellular phone used for radio transmission/reception.

BACKGROUND OF THE INVENTION

In general, portable type radio transmitter/receiver devices (hereinafter referred to as cellular phone) such as cellular phones are required to be more luggable and portable in practical use. So, the body of cellular phone is downsized and lightened as much as possible, and it is equipped with only required minimum functional parts. Thus, in regard to expansion functions, information-processing units such as a personal computer or various expansion cards are used to compensate them.

For example, when transmitting/receiving a large amount of data by using a cellular phone, the cellular phone 101 is, as shown in FIG. 1, connected to an information processing unit 102 such as a personal computer through a communication cable 103 and a PC card 104 as a communication adapter to conduct the communication work, since the cellular phone itself does not have sufficient memory capacity.

Thus, when conducting a large amount of information communication, the conventional cellular phones are needed to connect through the cable and card with the computer. Namely, in frequent use of information communication, the user always has to bring the cellular phone equipped with the communication cable and adapter card as well as the information processing unit such as a personal computer. Thus, the entire equipment is too large and heavy to bring. Also, the communication work must be complicated due to such components.

Although cellular phones adapted to GSM (global system for mobile communication), which is a standard of digital communication system, can use an IC card for SIM (subscriber identification module), the other cellular phones cannot be adapted to the GSM standard by itself.

To solve these problems in the conventional cellular phones, some cellular phones equipped with a built-in expansion IC card have been suggested.

For example, as shown in FIG. 2, a cellular phone suggested is composed of a printed wiring board 201 mounted on a cellular phone main body 200, and a socket 202 for IC card mounted on the board 201. A memory IC card is connected through the socket 202.

Such a cellular phone can be equipped with a plug-in size IC card for SIM, which is adapted to the GSM standard, through the plug-in socket. So, the cellular phone can be adapted to the GSM standard by itself.

Also, Japanese utility model application laid-open No.5-9057 (1993), Japanese utility model publication No.7-4661 (1995), Japanese utility model registration No.2569210 and Japanese patent No.2526500 disclose cellular phones in which a full size IC card is detachably attached between the cellular phone body and its battery pack. Such an IC card is available for expansion memory card or SIM card.

Such a cellular phone with detachable IC card can enjoy expansion functions by IC card such as memory capacity and operation processing functions, without accompanying large equipment. Thus, even when conducting such a large amount of information communication that conventionally a personal computer was required to connect, the cellular phone with detachable IC card can process the communication work by itself.

Meanwhile, as the IC card used to expand the function of cellular phone, there are generally two types of IC cards that are provided with plug-in size and full size, respectively, as shown in FIGS. 3A and 3B.

FIGS. 3A and 3B are plan views showing approximately actual sizes of IC cards. FIG. 3A shows a full size card and FIG. 3B shows a plug-in size card.

As shown in FIG. 3A, the full size IC card is composed of an about 87 mm long and about 55 mm wide plastic card into which an IC chip is buried. Its size is equal to that of a normal check card or cash card, and it is easy to handle and is portable independently. So, it is used as a detachable IC card to cellular phone body as described in Japanese utility model application laid-open No.5-9057.

On the other hand, as shown in FIG. 3B, the plug-in size IC card is composed of an about 26 mm long and about 15 mm wide plate into which an IC chip is buried. It is downsized to about 8% in area compared with the full size card, and is used as a built-in card to cellular phone body as the SIM card of GSM standard.

However, in the conventional cellular phones with built-in or detachable IC card, there are some problems described below.

First, in the cellular phone equipped with built-in IC card as shown in FIG. 2, the socket is mounted on the printed wiring board on the body and the IC card is connected with the socket, thereby the IC card is connected to the printed wiring board mounted on the body. Therefore, the thickness of cellular phone body must increase by the height of the socket, preventing the entire body of cellular phone from being lightened or downsized.

Also, in such cellular phone equipped with built-in IC card, it is impossible to use attaching another type of IC card to the body. So, in use of another type of IC memory card, the IC card has to be connected through some connection cable with the phone body as done in the conventional cellular phones. Thus, for example, in a GSM-compliant cellular phone, when using both the SIM card and the other IC card for storing data etc. or using a PC memory card to have data in common with personal computer, large and complicated components are required as done in the conventional cellular phones. So, this type of cellular phone also lacks in compatibility and scalability.

On the other hand, in the cellular phone equipped with detachable IC card in Japanese utility model application laid-open No.5-9057, there occurs a problem that the body of cellular phone cannot be downsized smaller than the full size IC card because all the IC cards attachable are of full size. Also, all the cellular phones disclosed in the above patents and utility models use its battery pack, as a disengagement-preventing means, to press the IC card against the body of cellular phone. Therefore, the battery pack itself has to be larger than the full size IC card, preventing the entire body of cellular phone from being downsized.

Also, in this type of cellular phones, since it only can be equipped with one detachable IC card, when using another type of IC card simultaneously, the IC card has to be connected through some connection cable with the phone body. Like the IC card built-in cellular phone in FIG. 2, in the GSM-compliant cellular phone, it is difficult to use with the other IC card or use a PC memory card for personal computer, large and complicated components are required as done in the conventional cellular phones. So, this type of cellular phone also lacks in compatibility and scalability.

SUMMARY OF THE INVENTION

Accordingly, it is an object of the invention to provide a cellular phone battery equipped with an IC card that allows a cellular phone to enjoy the expansion functions of IC cards while downsizing and lightening the main body of cellular phone.

According to the invention, a power-source battery unit to be attached detachably to a cellular phone for radio transmission/reception, comprises:

a battery cover with which a battery cell is covered;

a first card mounting part formed in the battery cover; and a plug-in size IC card attached detachably to the first card mounting part;

wherein when the battery unit is attached to the cellular phone, the terminal of the IC card attached to the first card mounting part is electrically connected to the cellular phone side.

BRIEF DESCRIPTION OF THE DRAWINGS

The invention will be explained in more detail in conjunction with the appended drawings, wherein:

FIG. 2 is an exploded view showing the conventional cellular phone with a plug-in size IC card built-in, FIG. 3A is a plan view showing approximately actual size of a full size IC card, FIG. 3B is a plan view showing approximately actual size of a plug-in size IC card.

DESCRIPTION OF THE PREFERRED EMBODIMENTS

Figure 1:
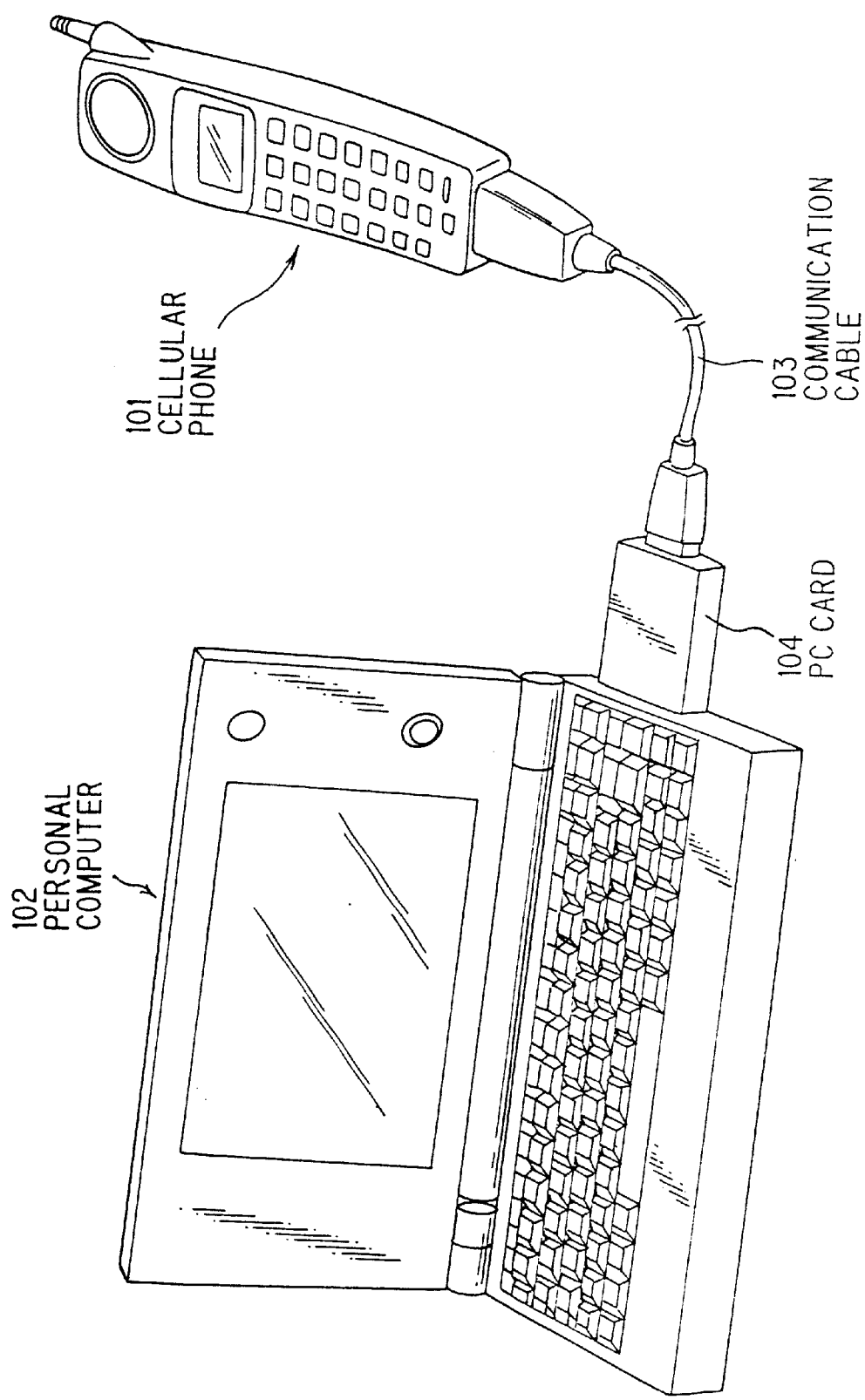
FIG. 1 is a perspective view showing a state that the conventional cellular phone is connected through a cable and a communication adapter card to a personal computer.
Figure 2:
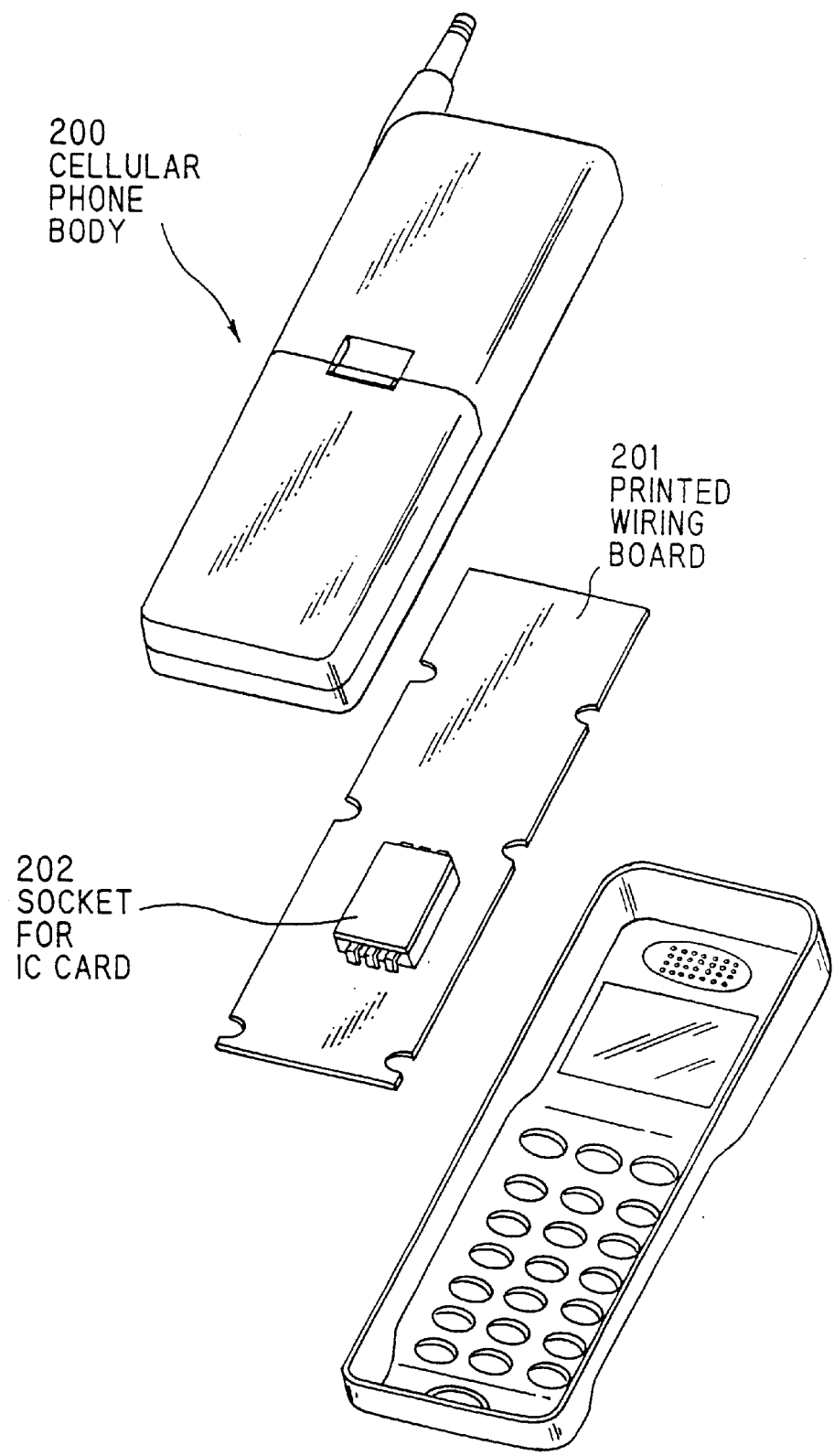

A cellular phone battery equipped with IC card in the preferred embodiments according to the invention will be explained below, referring to the drawings.

[First Embodiment]

Figure 4:
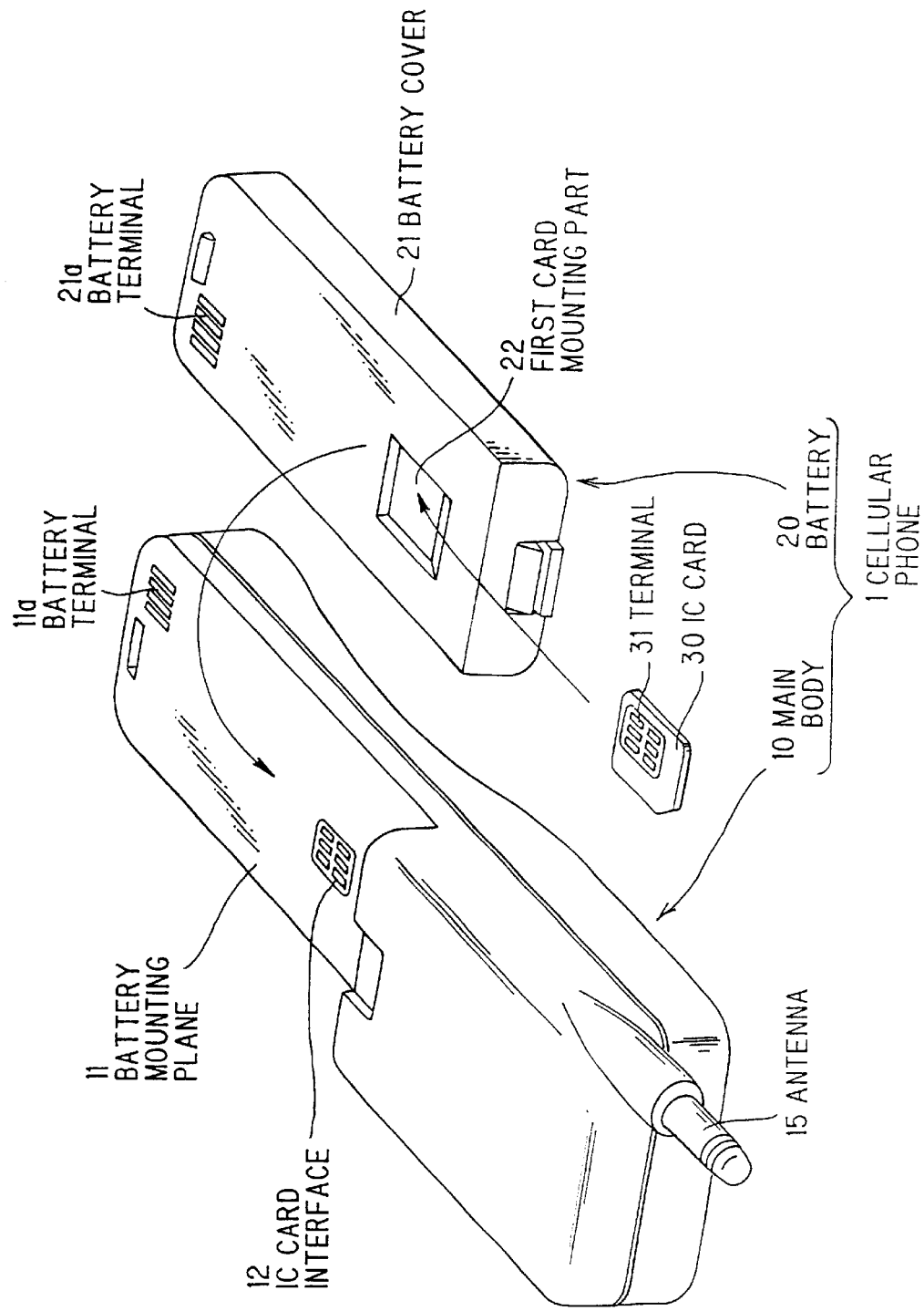
FIG. 4 is a perspective view (viewed from the back and top of cellular phone) showing a state that a cellular phone battery equipped with IC card in a first preferred embodiment according to the invention is detached from the body of cellular phone.
Figure 5:
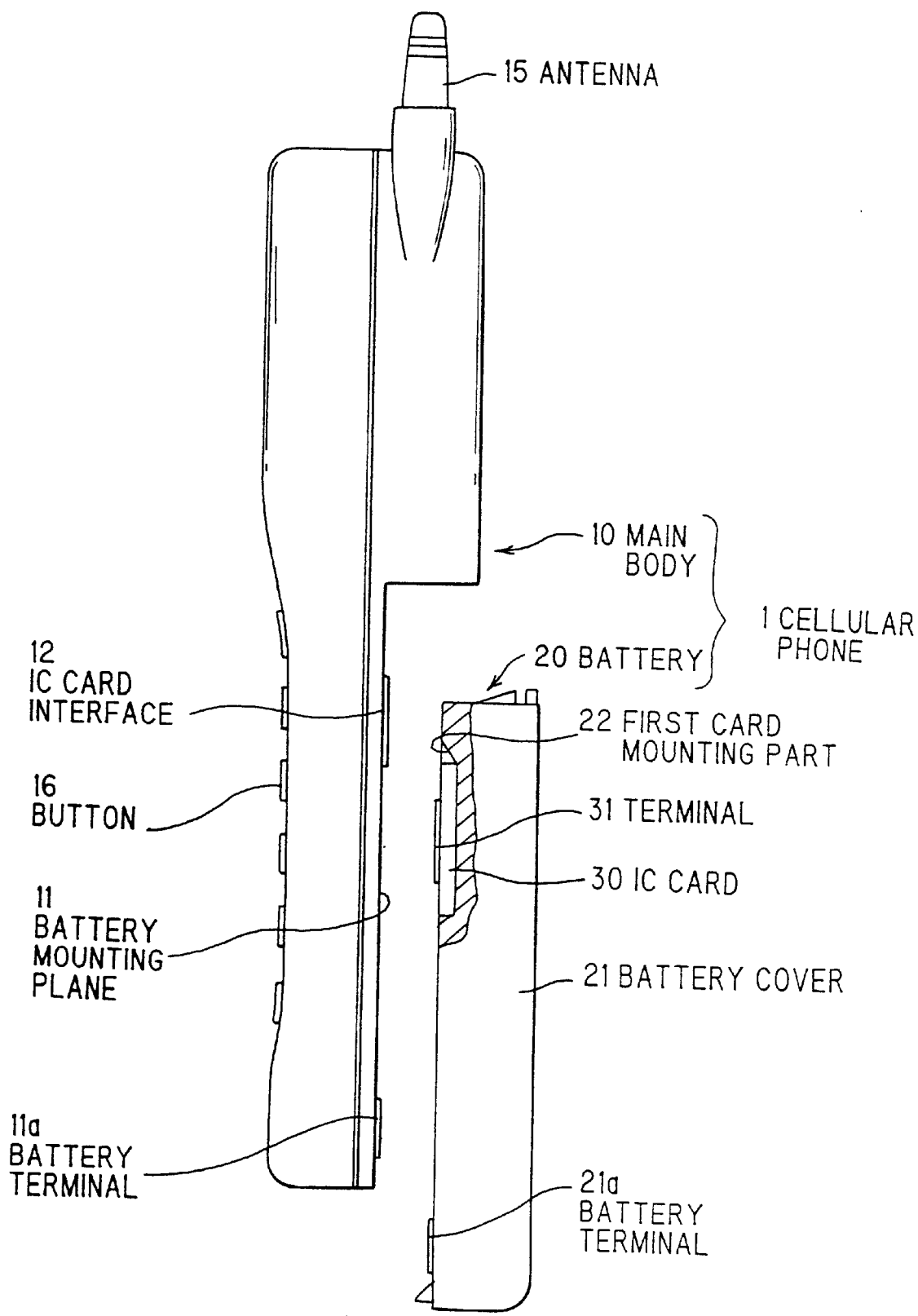
FIG. 5 is a partially broken side view showing a state that the battery in the first embodiment in FIG. 4 is detached from the body of cellular phone.

A cellular phone battery equipped with IC card in the first preferred embodiment according to the invention is explained in FIGS. 4 and 5.

FIG. 4 is a perspective view (phone is viewed from the back and top) showing a state that the cellular phone battery equipped with IC card in the first embodiment is detached from the body of cellular phone.

FIG. 5 is a partially broken side view showing a state that the battery in the first embodiment in FIG. 4 is detached from the body of cellular phone.

As shown in FIGS. 4 and 5, the cellular phone battery equipped with IC card in the first embodiment is a power-supply battery 20 which is detachably attached to the main body 10 of a cellular phone 1 to conduct radio transmission/reception. It is provided with a first card mounting part 22 to which an IC card 30 of plug-in size can be assembled detachably.

By assembling the plug-in size IC card 30 to the first card mounting part 22 and then attaching the battery 20 to the main body 10 of cellular phone, the IC card 30 allows the cellular phone to enjoy the expansion function.

The main body 10 of cellular phone is, as shown in FIG. 4, provided with a battery mounting plane 11 on the back side of the main body 10, on which the battery 20 can be detachably mounted.

The detachable mounting structure between the battery mounting plane 11 and the battery 20 is similar to the battery-mounting structure of normal cellular phone, e.g., the battery mounting plane 11 and the battery 20 are provided with uneven and/or hooking part to engage each other at the corresponding positions.

Also, the battery mounting plane 11 is provided with a battery terminal 11a to contact a battery terminal 21a on the battery 20 side, so that power from the battery 20 is supplied through the battery terminal 11a to the main body 10 of cellular phone.

Also, in this embodiment, as shown in FIGS. 4 and 5, the battery mounting plane 11 is provided with an IC card interface 12. The IC card interface 12 is connected with a printed wiring board (not shown) mounted inside the main body 10 of cellular phone. It is located at a position to contact a terminal 31 of the IC card 30 when the battery 20 is mounted on the battery mounting plane 11. Through the IC card interface 12, data processing is conducted between the IC card 30 and the main body 10 of cellular phone.

The battery 20 is composed of a battery cover 21 in which a battery cells (not shown) for power supply is contained. It can be detachably attached to the main body 10 of cellular phone by the uneven engaging means to engage with the battery mounting plane 11 side as described above.

The battery cover 21 is provided with the battery terminal 21a to contact the battery terminal 11a on the battery mounting plane 11 side, so that power from the battery 20 is supplied through the battery terminal 21a to the main body 10 of cellular phone.

In the battery 20, the first card mounting part 22 to which the plug-in size IC card 30 can be assembled detachably is provided on the battery cover 21. As shown in FIG. 4, the first card mounting part 22 is formed concavely in the plane of the battery cover 21 facing to the battery mounting plane 11. It is located at such a position that the terminal 31 of the IC card 30 to be assembled contact the IC card interface 12 when the battery 20 is attached to the main body 10 of cellular phone.

Here, the first card mounting part 22 in this embodiment is formed concavely, so that the plug-in size IC card 30 can be fitted thereto laterally or, from above. Namely, the first card mounting part 22 has a concave shape with a size and a depth nearly equal to the IC card 30, so that the IC card 30 can be tightly fitted thereto by sliding laterally or pressing from above.

Thus, the IC card 30 can be assembled buried under the plane of the battery cover 21 without protruding from the surface of the battery cover 21 (see FIG. 5).

Meanwhile, in this embodiment, as shown in FIGS. 4 and 5, the first card mounting part 22 is provided with a slope at the top edge, so that the IC card 30 can be easily fitted by sliding laterally.

In this embodiment, as the detachable engagement structure between the first card mounting part 22 and the IC card 30, the first card mounting part 22 is provided with a size nearly equal to the IC card 30 so as to make the IC card 30 tightly fit to the first card mounting part 22. However, another engagement structure may be applied.

For example, the first card mounting part 22 may be provided with a guide means, on the inside wall, which is such a groove or protrusion to be engaged with the edge of the IC card 30 that the IC card 30 can be fitted to the first card mounting part 22 by the guide means.

Also, the first card mounting part 22 may be provided with an adhesive member, at the bottom, which can fix the IC card 30 by adhesive power.

In this embodiment, the IC card 30 is provided with plug-in size as shown in FIG. 3B, and is composed of an about 26 mm long and about 15 mm wide plate into which a chip is buried and on which the terminal 31 is exposed.

As the IC card 30, any functional cards with plug-in size which can be fitted to the first card mounting part 22 may be applied. Two or more cards can be also used selectively.

In this embodiment, of the IC cards 30, at least one card is a SIM card which is based on ISO7816 and is compliant to the GSM standard described above. Therefore, by attaching the battery 20 to the main body 10 of cellular phone while assembling the IC card 30 to the first card mounting part 22, the cellular phone 1 in the embodiment can be used as a GSM-compliant phone.

Besides the above composition, the main body 10 and the battery 20 composing the cellular phone 1 in this embodiment have a structure nearly equal to normal cellular phones. An antenna 15 to transmit/receive signal is equipped at the top of the main body 10, and buttons 16 (see FIG. 5) for input operation and a display (not shown) are disposed on the front face of the main body 10.

Also, the battery 20 is provided with a charging terminal (not shown) at the lower end of the battery cover 21, like normal cellular phones.

In the cellular phone battery equipped with IC card in this embodiment composed as described above, the first card mounting part 22 to which the plug-in size IC card 30 can be attached is provided on the battery cover 21 of the battery 20, and the IC card interface 12 which directly contacts the terminal 31 of the IC card 30 to electrically connect with the main body 10 of cellular phone is provided on the battery mounting plane 11 of the main body 10 of cellular phone. Therefore, by attaching only the battery 20 equipped with the IC card 30 to the main body 10 of cellular phone, the IC card 30 allows the cellular phone to enjoy the expansion function.

Thus, with the battery 20 to which the plug-in size IC card 30 can be attached, by assembling the IC card 30 with area of about 8% compared with the normal full size card to be buried into concave part formed on the battery cover 21, the cellular phone can enjoy the expansion functions.

The IC card 30 can be assembled by using only the thickness of the battery cover 21 without requiring any complicated mounting means such as a socketing means. So, the problems in the conventional cellular phones, i.e., the size of main body increases due to the IC card equipped or the size of main body or battery is limited by the full size card equipped, can be solved. Therefore, in this embodiment, the expansion functions of IC card can be enjoyed while downsizing and lightening the entire body of cellular phone. Accordingly, the compatibility and scalability of cellular phone can be enhanced.

Although, in this embodiment, the one first card mounting part 22 is formed on the battery 20 so that the one IC card 30 can be assembled thereto, multiple first card mounting parts 22 may be formed and corresponding multiple IC card interfaces 12 may be formed on the main body 10 side. Thereby, multiple IC cards 30 can be used simultaneously.

Also, as described later in the third preferred embodiment, second card mounting part to which another kind of card, different from the IC card 30, is assembled may be provided. So, the IC card 30*a* and the other card can be used simultaneously.

[Second Embodiment]

Figure 6:
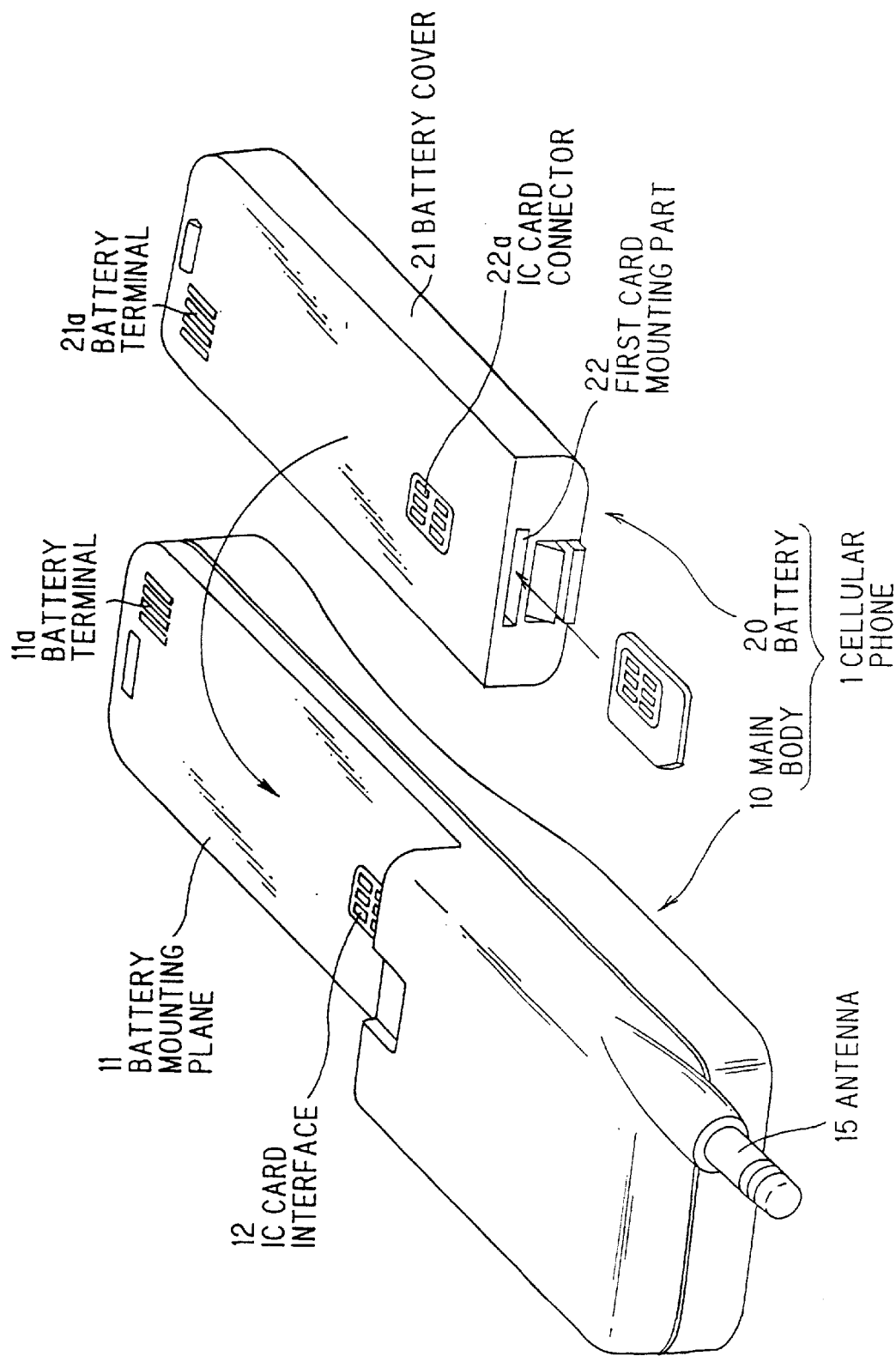
FIG. 6 is a perspective view (viewed from the back and top of cellular phone) showing a state that a cellular phone battery equipped with IC card in a second preferred embodiment according to the invention is detached from the body of cellular phone.
Figure 7:
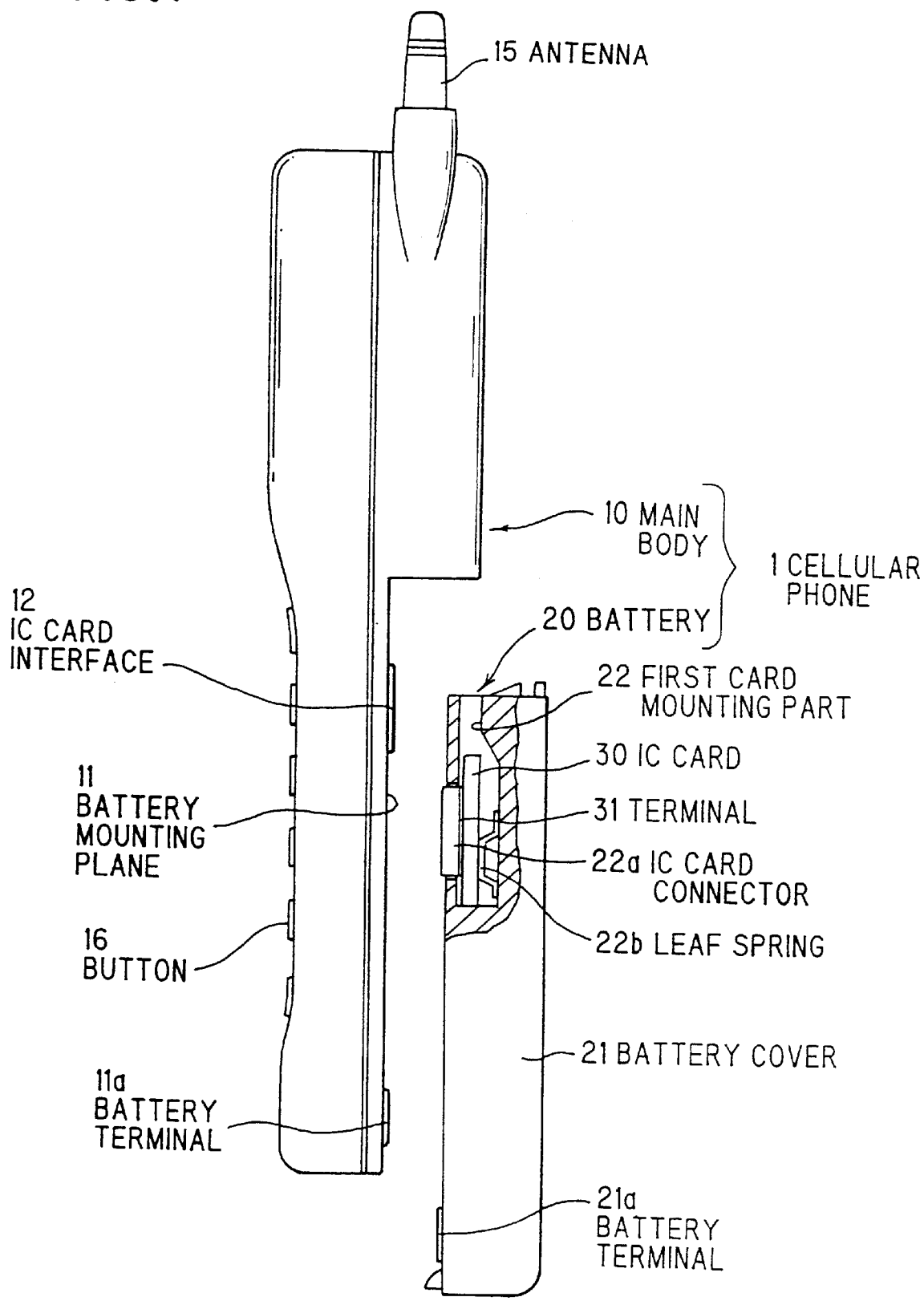
FIG. 7 is a partially broken side view showing a state that the battery in the second embodiment in FIG. 6 is detached from the body of cellular phone.

A cellular phone battery equipped with IC card in the second preferred embodiment according to the invention is explained in FIGS. 6 and 7.

FIG. 6 is a perspective view (phone is viewed from the back and top) showing a state that the cellular phone battery equipped with IC card in the second embodiment is detached from the body of cellular phone.

FIG. 7 is a partially broken side view showing a state that the battery in the second embodiment in FIG. 6 is detached from the body of cellular phone.

As shown in FIGS. 6 and 7, the cellular phone battery equipped with IC card in the second embodiment is a modification of the first embodiment. As the first card mounting part 22 to which the IC card 30 is assembled, a hole-type mounting part is formed in the battery cover 21 of the battery 20, in place of the concave part in the first embodiment.

The other components are the same as in the first embodiment, therefore like parts are indicated by like reference numerals as used in FIGS. 4 and 5 and their explanations are omitted herein.

As shown in FIGS. 6 and 7, in the second embodiment, the first card mounting part 22 to which the IC card 30 is assembled is given as a hole formed in the battery cover 21 of the battery 20.

This hole-type card mounting part 22 is hollow part which extends along the longitudinal direction of the cellular phone from the side of the battery 20, and into which the IC card 30 can be inserted.

Also, the card mounting part 22 is provided with an IC card connector 22*a* which is exposed at the surface of the battery cover 21 to electrically connect between the inside and outside of the hole. The connector 22*a* contacts the terminal 31 of the IC card 30 inserted into the hole and the IC card interface 12 on the main body 10 of cellular phone, thereby the IC card 30 is electrically connected with the main body 10 of cellular phone.

Also, as shown in FIG. 7, the hole-type card mounting part 22 is provided with a leaf spring 22*b* to press the IC card 30 against the connector 22*a* side. Thereby, the terminal 31 of the IC card 30 can surely contact the connector 22*a* to yield electrical connection.

Also, the IC card 30 to be inserted into the hole-type mounting part 22 is positioned and supported by a card supporting means (not shown) equipped on the mounting part 22 side when completely mounted at a given mounting position. Further, the IC card 30 can be easily disassembled by an ejector means (not shown) equipped on the mounting part 22 side.

In the cellular phone battery equipped with IC card in this embodiment composed as described above, the IC card 30 can be used inserting into the hole-type card mounting part 22 that is formed into the side face of the battery 20. So, like the first embodiment, the IC card 30 can be used while downsizing and lightening the entire body of cellular phone, without increasing the entire body size of cellular phone or limiting the size of the main body 10 of cellular phone and battery 20.

[Third Embodiment]

Figure 8:
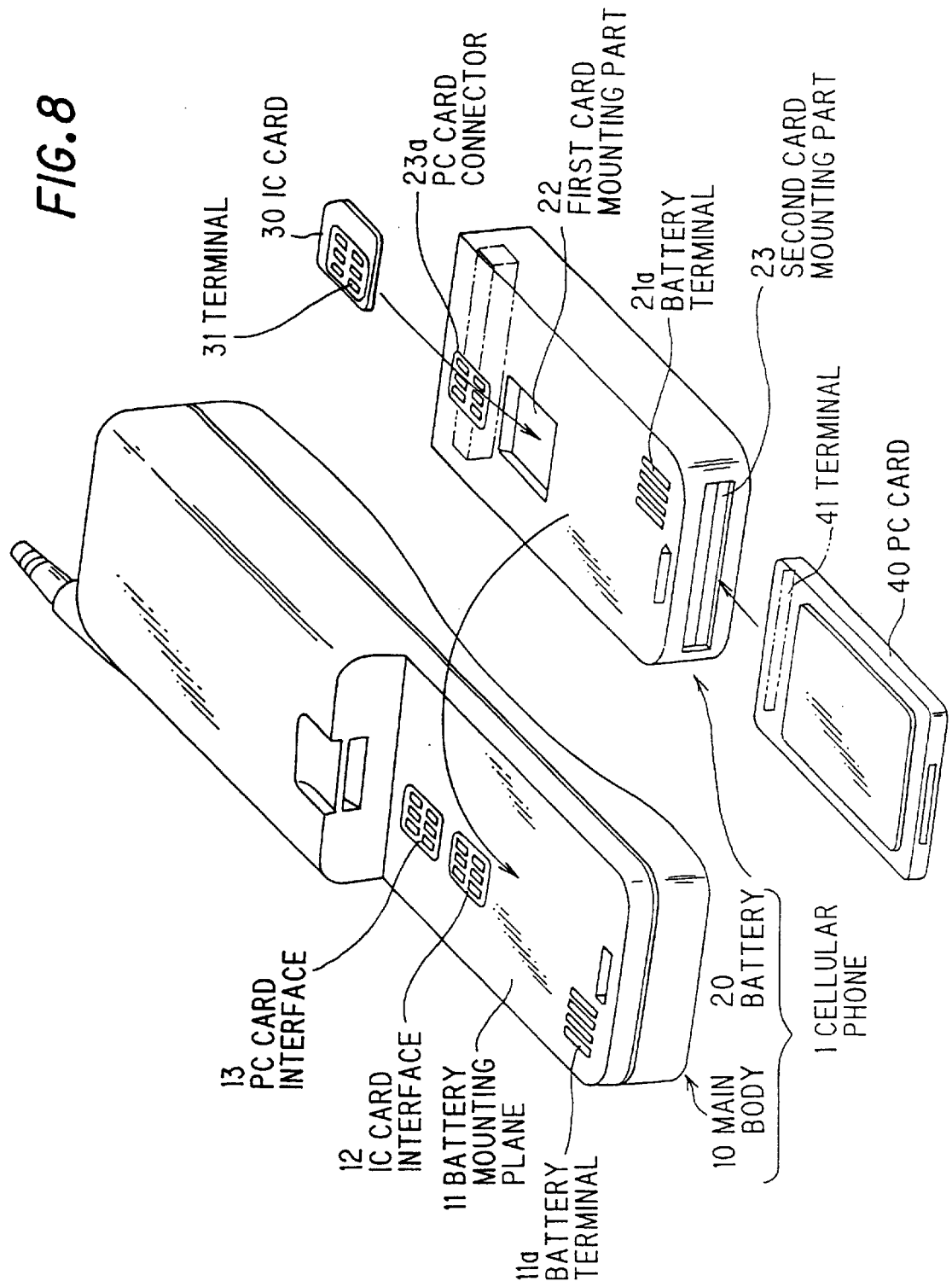
FIG. 8 is a perspective view (viewed from the back and bottom of cellular phone) showing a state that a cellular phone battery equipped with IC card in a third preferred embodiment according to the invention is detached from the body of cellular phone.
Figure 9:
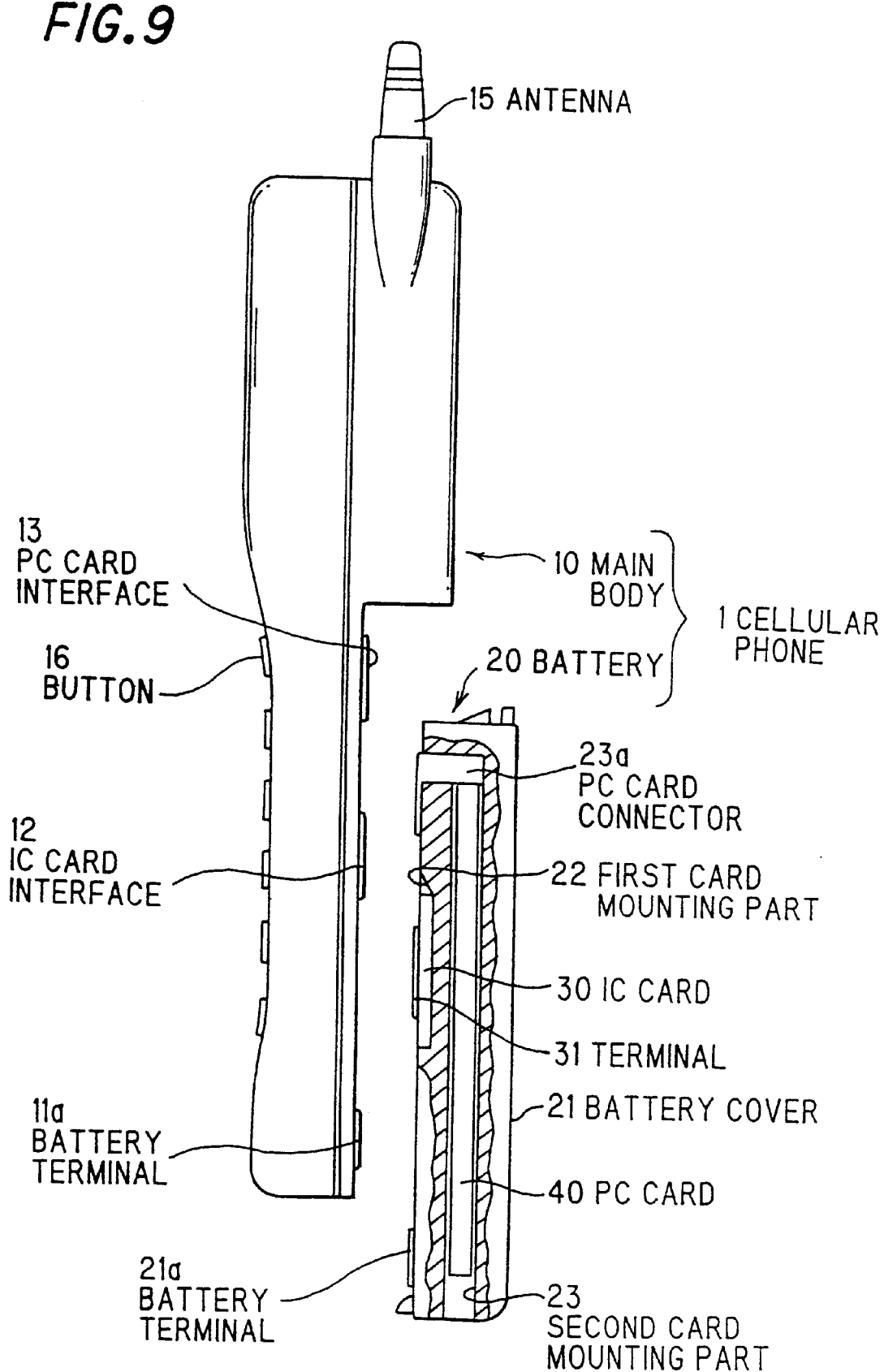
FIG. 9 is a partially broken side view showing a state that the battery in the third embodiment in FIG. 8 is detached from the body of cellular phone.

A cellular phone battery equipped with IC card in the third preferred embodiment according to the invention is explained in FIGS. 8 and 9.

FIG. 8 is a perspective view (phone is viewed from the back and bottom) showing a state that the cellular phone battery equipped with IC card in the third embodiment is detached from the body of cellular phone.

FIG. 9 is a partially broken side view showing a state that the battery in the third embodiment in FIG. 8 is detached from the body of cellular phone.

As shown in FIGS. 8 and 9, the cellular phone battery equipped with IC card in the third embodiment is a modification of the first embodiment. In addition to the first concave card mounting part 22 to which the IC card 30 is assembled, a second card mounting part 23 to which a PC card 40 is assembled is formed in the battery cover 21 of the battery 20.

The other components are the same as in the first embodiment, therefore like parts are indicated by like reference numerals as used in FIGS. 4 and 5 and their explanations are omitted herein.

As shown in FIGS. 8 and 9, in the third embodiment, the battery 20 is provided with the second card mounting part 23 to which the PC card 40 is assembled.

The second card mounting part 23 is composed like an expansion card slot equipped in typical personal computers, and is hollow part which extends along the longitudinal direction of the cellular phone from the side of the battery 20, and into which the PC card 40 with a terminal 41 at the end can be inserted.

Here, the PC card 40 has a size nearly equal to the full size card in FIG. 3A, and is applicable by a memory card compliant to type II of PCMCIA, PCMCIA 2.0 and 2.1, a smart media card, a compact flash card etc.

There is provided a PC card connector 23a to which the terminal 41 at the end of the PC card 40 is connected at the deepest end, in the direction of card insertion, of the second card mounting part 23. The PC card connector 23a is equipped with a terminal which is exposed at the side of the battery 20 facing to the main body 10 of cellular phone. On the other hand, a PC card interface 13 is provided, on the battery mounting plane 11, at the position corresponding to the PC card connector 23a, and is connected with a printed wiring board (not shown) of the main body 10 of cellular phone.

When attaching the battery 20 equipped with the PC card 40 inserted into the second card mounting part 23 to the main body 10 of cellular phone, the terminal 41 at the PC card 40 is electrically connected, through the PC card connector 23a, with the PC card interface 13 on the main body 10 of cellular phone. Thus, the PC card 40 allows the cellular phone to enjoy the expansion function.

Also, the PC card 40 to be inserted into the second card mounting part 23 is positioned and supported by a card supporting means (not shown) equipped on the second card mounting part 23 side when completely mounted at a given mounting position, like the PC cards for typical personal computer. Further, the PC card 40 can be easily disassembled by an ejector means (not shown) equipped on the second card mounting part 23.

In the cellular phone battery equipped with IC card in the third embodiment composed as above, by attaching the PC card 40 to the second card mounting part 23, the full size PC card 40 can be used simultaneously with the plug-in size IC card 30.

Thus, when using the PC card 40 as a memory card, data obtained by using the cellular phone 1 can be stored in the PC card 40 through the operation of button on the main body 10 of cellular phone, or data stored in the PC card 40 can be read through the operation of the main body 10 of cellular phone. For example, data obtained by connecting directly to the Internet using the cellular phone 1 can be directly stored into the PC card 40 through the operation of the main body 10 of cellular phone.

Also, in this embodiment, although detailed explanation thereof is omitted, data conversion part to convert data of the PC card 40 into a given format is provided on the battery 20 side.

Although the PC card 40 is backed up by a power supply provided in the card, it can be also powered from the battery 20 side in case of emergency.

As described above, the cellular phone battery in the third embodiment can enjoy the same effect as in the first and second embodiment. Moreover, it can use the PC card 40 with the IC card 30, therefore requiring no additional memory card connected through a cable. Especially in a GSM-compliant cellular phone, the SIM card can be easily used simultaneously with another IC card to store data. Accordingly, without requiring large and complicated components, the compatibility and scalability of cellular phone can be enhanced.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A power source battery unit to be detachably attached to a main body of a portable telephone for radio transmission/reception, comprising:

a battery cover for containing a battery cell; and a card mounting part formed as a concave recess on the battery cover such that an IC card can be removably received therein in an orientation in which a terminal on the IC card faces outwardly so that when an IC card is received in the card mounting part and the battery unit is attached to the main body of the portable telephone, the terminal of the received IC card directly contacts an IC card interface on the surface of the main body of the portable telephone to thereby establish an electrical connection therebetween.

2. The battery unit according to claim 1, wherein the card mounting part is sized to receive a plug-in micro sized IC card.

3. A power source battery unit to be detachably attached to a main body of a portable telephone for radio transmission/reception, comprising:

a battery cover for containing a battery cell;

a card mounting part formed as a slot in the battery cover and sized to removably receive a plug-in micro sized IC card to be inserted therein; and a connector formed in the battery cover so as to contact a terminal of an IC card when an IC card is inserted into the card mounting part and so as to contact an IC card interface on the surface of the main body of the portable telephone when the battery unit is attached to the main body of the portable telephone, to thereby establish a respective electrical connection therebetween.

4. A power source battery unit to be detachably attached to a main body of a portable telephone for radio transmission/reception, comprising:

a battery cover for containing a battery cell; and at least a first card mounting part formed in the battery cover for removably receiving a first IC card and a second card mounting part formed in the battery cover for removably receiving a second IC card, such that when a first IC card is received in the first card mounting part and a second IC card is received in the second card mounting part, upon attachment of the battery unit to the main body of the portable telephone, both the first and second IC cards are electrically connected to the main body of the portable telephone so as to be simultaneously usable by the portable telephone.

5. The battery unit according to claim 4, wherein the first and second card mounting parts are each formed as a concave recess on the battery cover and sized to receive a plug-in sized IC card.

6. The battery unit according to claim 4, wherein the first card mounting part is formed as a concave recess on the battery cover and the second card mounting part formed as a slot in the battery cover.

7. The battery unit according to claim 6, wherein the first and second card mounting parts are each sized to receive a plug-in micro sized IC card.

8. The battery unit according to claim 4, wherein the first card mounting part is sized to receive a plug-in micro sized IC card and the second card mounting pant is sized to receive a full-sized PC card.

9. A portable communication device comprising:

a main body having an IC card interface; and a battery unit detachably attachable to the main body, the battery unit including a battery cover for containing a battery cell, and a card mounting part formed as a concave recess on the battery cover for removably receiving an IC card in an orientation in which a terminal on the IC card faces outwardly so that when an IC card is received in the card mounting part and the battery unit is attached to the main body, the terminal of the received IC card directly contacts the IC card interface on the main body to thereby establish an electrical connection therebetween.

10. The portable communication device according to claim 9, wherein the card mounting part is sized to receive a plug-in micro sized card.

11. The portable communication device according to claim 10, further comprising a global mobile communication system compliant plug-in sized SIM card received in the card mounting part.

12. A portable communication device comprising:

a main body having an IC card interface; and a battery unit detachably attachable to the main body, the battery unit including a battery cover for containing a battery cell, a card mounting part formed as a slot in the battery cover and sized to removably receive a plug-in micro sized IC card, and a connector formed in the battery cover so as to contact a terminal of an IC card when an IC card is inserted into the card mounting part and so as to contact the IC card interface on the main body when the battery unit is attached to the main body, to thereby establish a respective electrical connection therebetween.

13. The portable communication device according to claim 12, further comprising a global mobile communication system compliant plug-in sized SIM card received in the card mounting part.

14. A portable communication device comprising:

a main body having at least a first IC card interface and a second IC card interface; and a battery unit detachably attachable to the main body, the battery unit including a battery cover for containing a battery cell, and at least a first card mounting part formed in the battery cover for removably receiving a first IC card and a second card mounting part formed in the battery cover for removably receiving a second IC card, such that when a first IC card is received in the first card mounting part and a second IC card is received in the second card mounting part, upon attachment of the battery unit to the main body of the portable communication device, the first and second IC cards are respectively electrically connected to the first and second IC card interfaces on the main body so as to be simultaneously usable by the portable communication device.

15. The portable communication device according to claim 14, wherein first and second card mounting parts are each formed as a concave recess on the battery cover such that a plug-in micro sized IC card can be received in the concave recess in an orientation in which a terminal on the IC card faces outwardly so that when a plug-in micro sized IC card is received in the concave recess and the battery unit is attached to the main body, the terminal of the received IC card directly contacts a respective one of the first and second IC card interfaces on the main body to thereby establish an electrical connection therebetween.

16. The portable communication device according to claim 14, wherein the first card mounting part is formed as a concave recess on the battery cover and the second card mounting part formed as a slot in the battery cover.

17. The portable communication device according to claim 16, wherein the first and second card mounting parts are each sized to receive a plug-in micro sized IC card.

18. The portable communication device according to claim 14, wherein the first card mounting part is sized to receive a plug-in micro sized IC card and the second card mounting part is sized to receive a full sized PC card.

19. The portable communication device according to claim 14, further comprising at least one global mobile communication system compliant SIM card to be received in a corresponding one of the fist and second card mounting parts.

* * * * *